Aug. 10, 1965                    J. GILLOIS ETAL                3,199,486
                                 AMPHIBIOUS VEHICLE
Filed June 7, 1963                                            15 Sheets-Sheet 1

INVENTORS
JEAN GILLOIS AND
HERMANN WALTER GEHLEN
By

AGT.

Aug. 10, 1965   J. GILLOIS ETAL   3,199,486
AMPHIBIOUS VEHICLE
Filed June 7, 1963   15 Sheets-Sheet 5

INVENTORS
JEAN GILLOIS AND
HERMANN WALTER GEHLEN
BY
Robert H. Jacob
AGT.

Aug. 10, 1965  J. GILLOIS ETAL  3,199,486
AMPHIBIOUS VEHICLE
Filed June 7, 1963  15 Sheets-Sheet 6

INVENTORS
JEAN GILLOIS AND
HERMANN WALTER
GEHLEN
BY
Robert H. Friet
AGT.

INVENTORS
JEAN GILLOIS AND
HERMANN WALTER GEHLEN
BY

AGT.

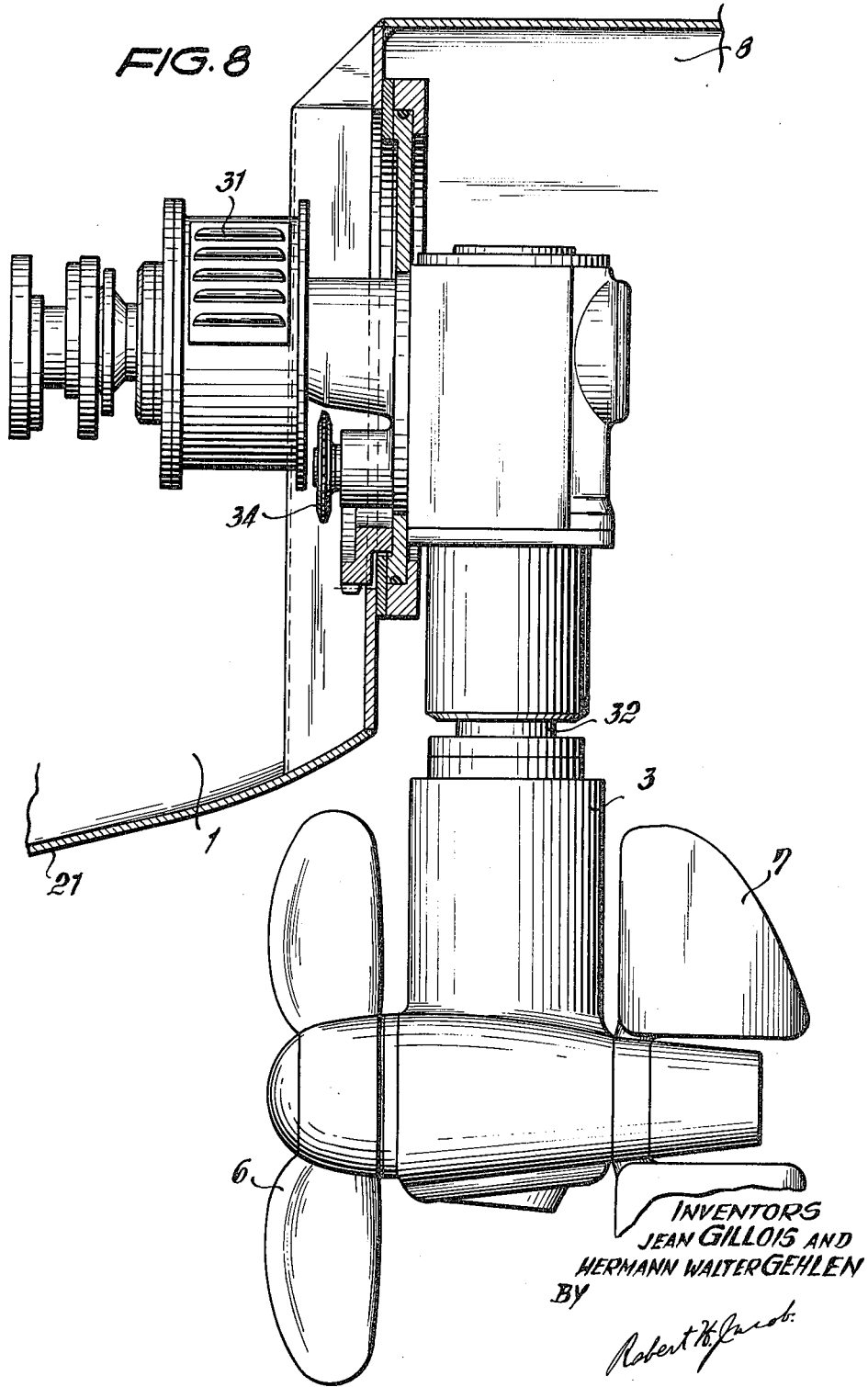

Aug. 10, 1965   J. GILLOIS ETAL   3,199,486
AMPHIBIOUS VEHICLE
Filed June 7, 1963   15 Sheets-Sheet 9

FIG. 8a

INVENTORS
JEAN GILLOIS AND
HERMANN WALTER GEHLEN
BY
Robert H. Jacob
AGT.

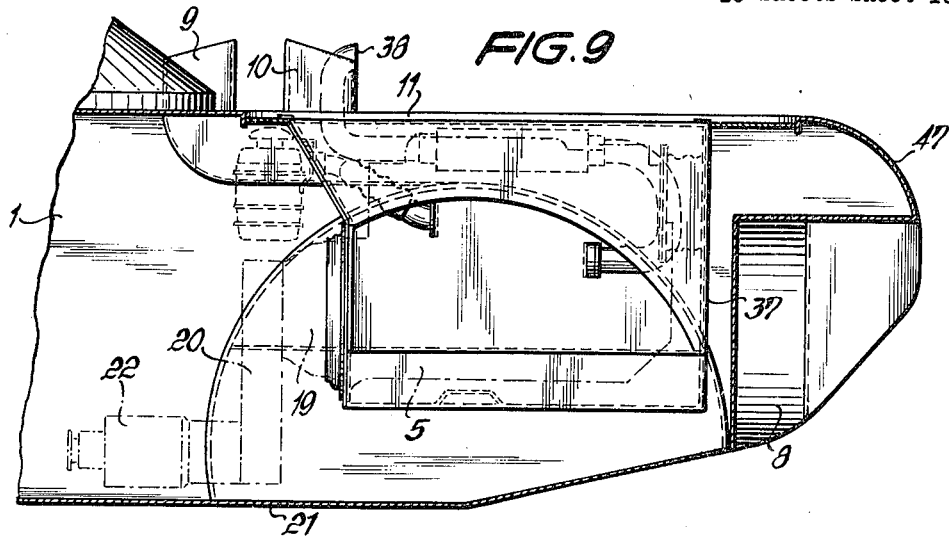
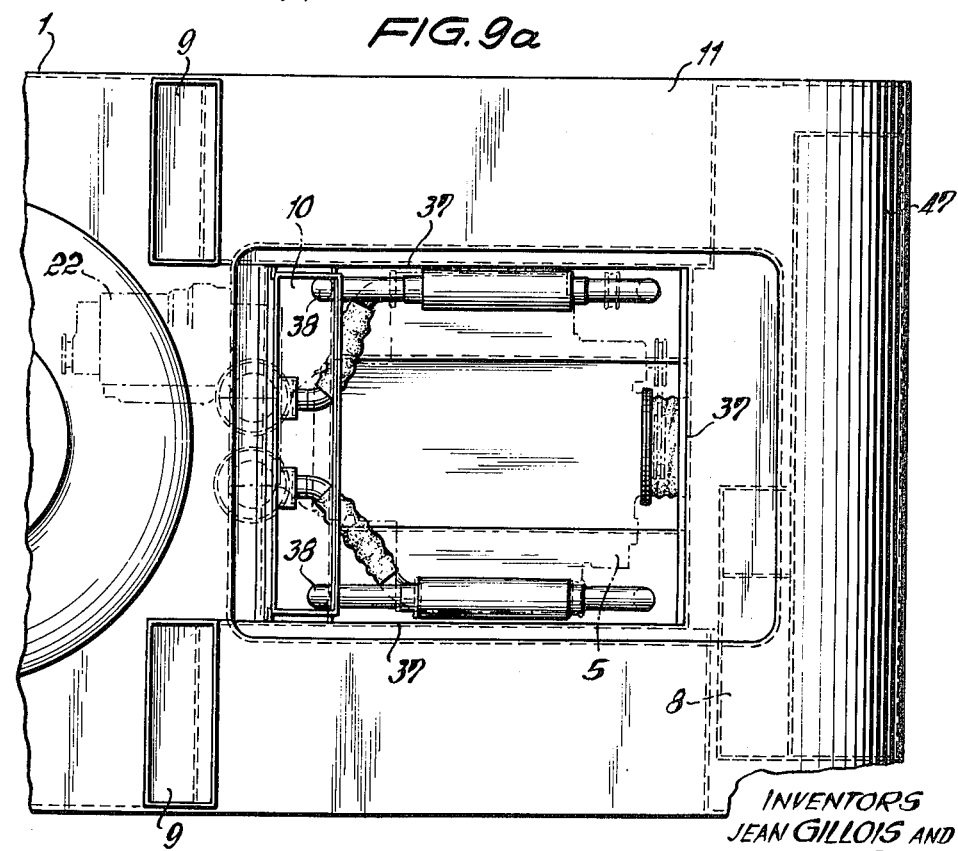

Aug. 10, 1965        J. GILLOIS ETAL        3,199,486
AMPHIBIOUS VEHICLE
Filed June 7, 1963        15 Sheets-Sheet 11

INVENTORS
JEAN GILLOIS AND
HERMANN WALTER GEHLEN
BY
AGT.

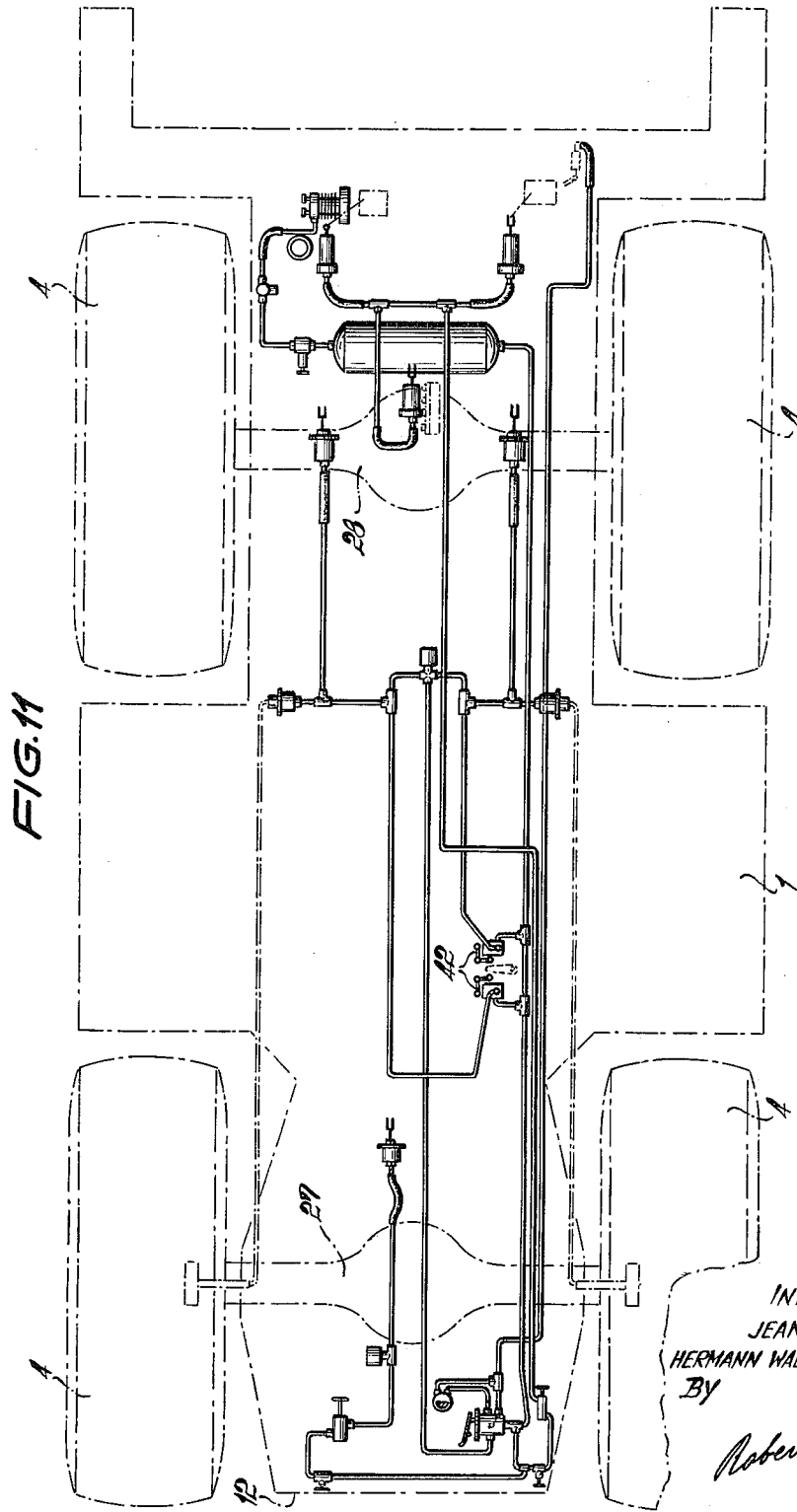

Aug. 10, 1965   J. GILLOIS ETAL   3,199,486
AMPHIBIOUS VEHICLE
Filed June 7, 1963   15 Sheets-Sheet 13
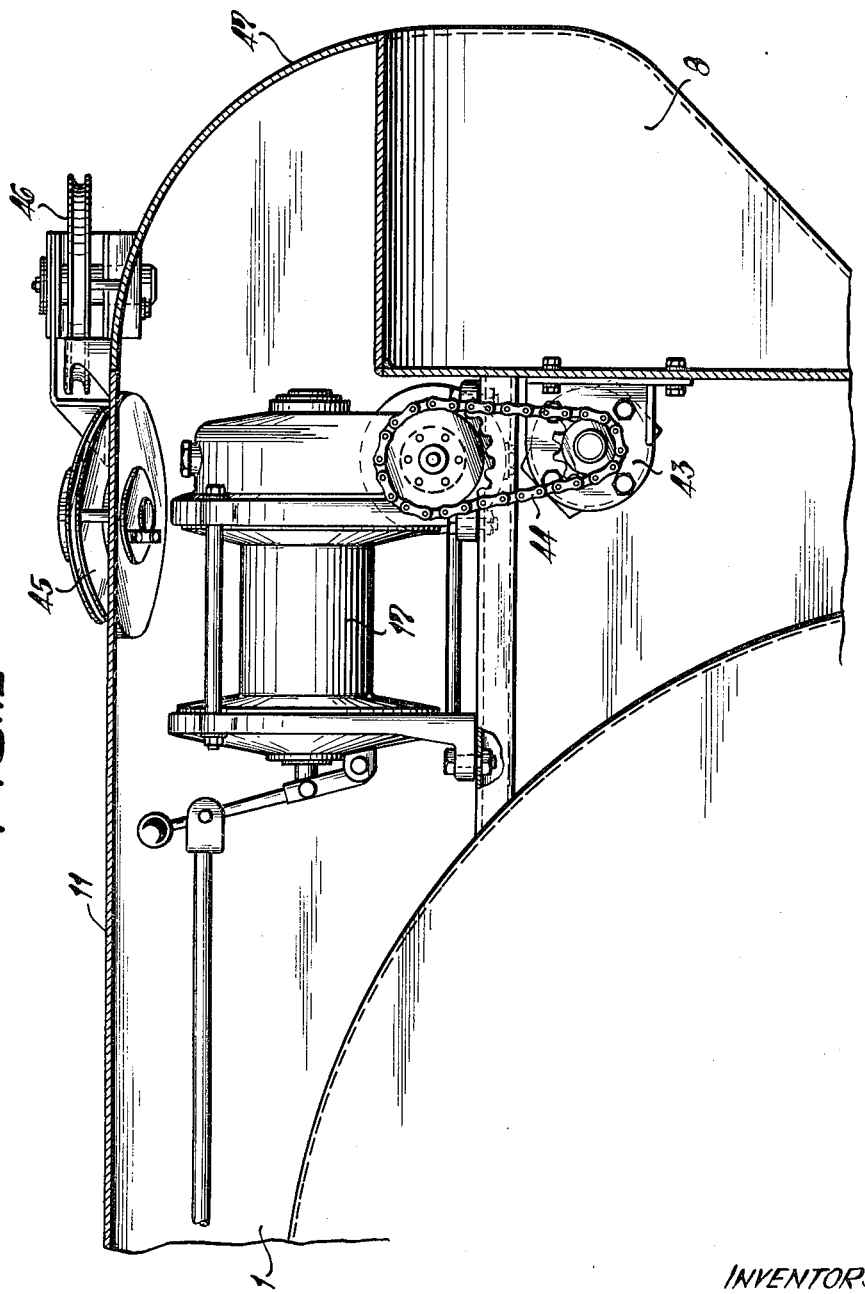
INVENTORS
JEAN GILLOIS AND
HERMANN WALTER GEHLEN
BY
Robert H Jacob
AGT.

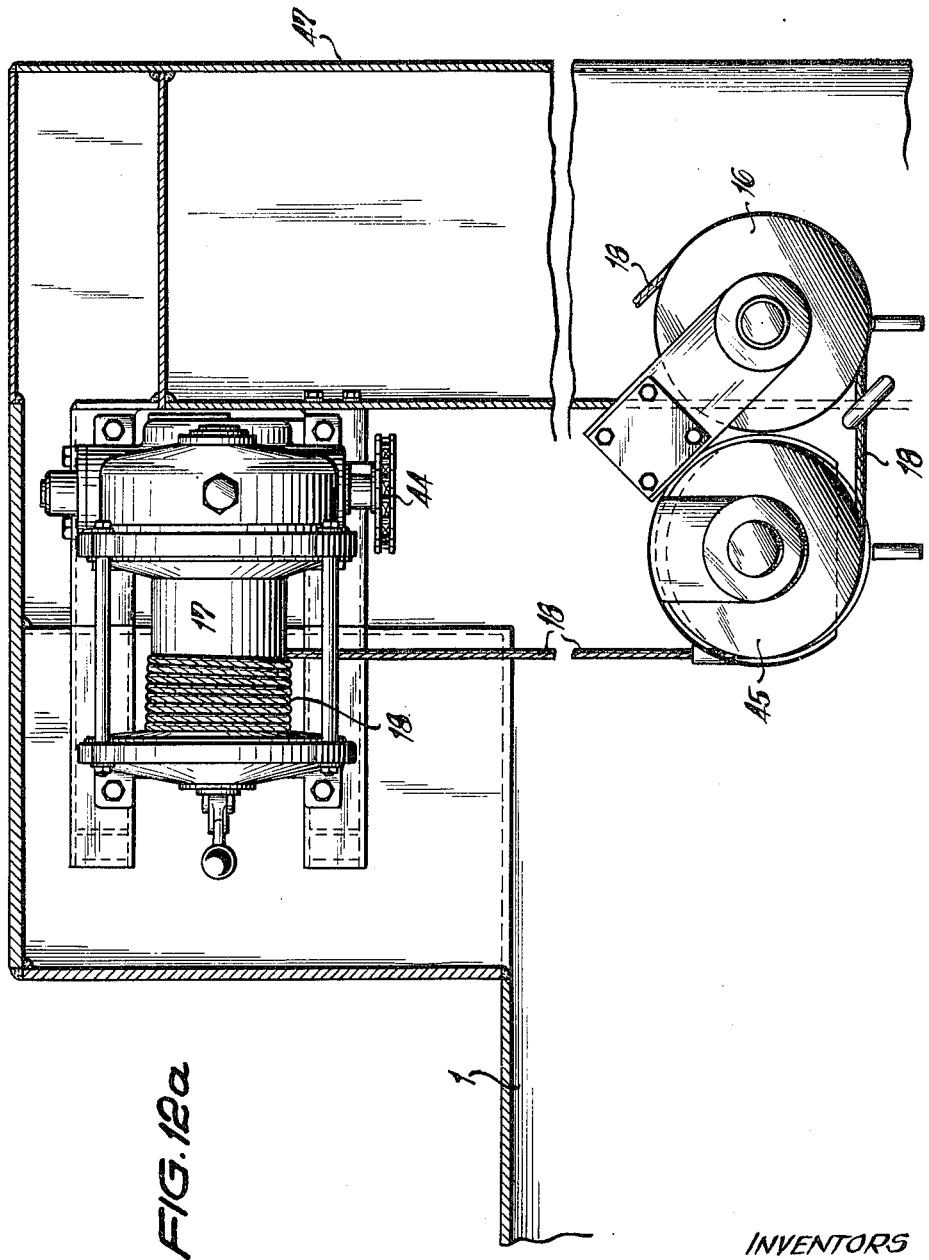

Aug. 10, 1965  J. GILLOIS ETAL  3,199,486
AMPHIBIOUS VEHICLE
Filed June 7, 1963  15 Sheets-Sheet 15

INVENTORS
JEAN GILLIOS AND
HERMANN WALTER GEHLEN
BY
Robert H Jacob
AGT.

United States Patent Office

3,199,486
Patented Aug. 10, 1965

1

3,199,486
AMPHIBIOUS VEHICLE
Jean Gillois, Westring 10, Rastatt, Germany, and Hermann Walter Gehlen, Pirmasenserstrasse 60, Kaiserslautern, Pfalz, Germany
Filed June 7, 1963, Ser. No. 286,225
Claims priority, application Germany, June 7, 1962,
G 35,152
2 Claims. (Cl. 115—1)

The invention relates to amphibious vehicles and is particularly concerned with an amphibious vehicle that can be equipped with an armored body and which is provided with a wheel drive for travel on land and a propeller drive for travel on water.

Heretofore armored amphibious vehicles were constructed with endless tracks because better cross-country maneuverability of the vehicle was expected from such means of mobility. The structures were designed in accordance with the principle that the endless tracks would have to be of such dimensions that the weight of the vehicle exerts a pressure on the ground of approximately 1 kg. per cm.$^2$. This ground pressure, however, becomes much higher in uneven terrain, because only a part of the endless track chain will be in supporting contact with the ground at any time. In swampy terrain the track chain will dig into the ground, which increases the drive resistance, and that in turn results in slipping of the track and in the vehicle milling even deeper into the ground. Freeing the vehicle without outside help to restore mobility was then not possible.

Moreover, the chain system and the spring system connected therewith takes up a considerable proportion of the total weight of such endless track vehicles. This means that the necessary armoring must be lighter and/or that the possibility of any additional load is reduced.

If the vehicle is only moved by means of the chains in water as well as on land, as is usually the case, then it attains only low speeds and is unable to operate in heavy currents. This is particularly the case at the time of landing. The chains of the vehicle are not able to bring the vehicle transversely of the stream toward the bank. There the vehicle always assumes an oblique position, which can result in dangerous transverse overflooding.

Furthermore, the use of track chains introduces a requisite for short structural length of the vehicle. In order to insure the necessary buoyancy to enable the vehicle to float, the construction of the vehicle must be correspondingly higher which is undesirable, especially with combat vehicles.

The known vehicles having armored bodies therefore cannot be considered to be true amphibious vehicles. They are rather a mere adaptation of known land traveling endless track vehicles that are hardly suitable for amphibious deployment and which, nevertheless, owing to the outfitting that may be admissible or other construction of the vehicle, may only be lightly armored and armed, so that they lose even some of their original good qualities and attributes.

Accordingly attempts have already been made to equip conventional known armored vehicles with an air snorkel in order to forego the equipment necessary for a vehicle that floats. Also this did not provide a satisfactory result, particularly with rapid or strong current.

2

Moreover, the deployment of these vehicles always required a certain preparation of the banks.

It is, therefore, an object of the invention to provide an amphibious vehicle, preferably one having an armored body that is capable of independently moving on land as well as in water and which, moreover, is capable of negotiating the regions of the banks between water and land without outside assistance. It should be noted that in deploying amphibious vehicles, negotiating the regions of the banks constitutes the main problem. To be sure, with the present state of the art there are no difficulties encountered in constructing and equipping a vehicle for deployment on land in such a manner that it can meet certain requirements. Likewise there are no special problems in developing vehicles especially for travel on water. However, if the vehicles are actually for use both on land and in the water and are to have equally satisfactory deployment qualities, then the solution for such deployment ability must be found in the facility of negotiating the regions between water and land. There swampy areas exist which, as already mentioned above, cannot be negotiated by track chain vehicles. That applies moreover, also to sandy soil on land, so that for negotiating regular sand stretches special vehicles with wheel drive have already been constructed. Also there bank slopes are frequently encountered which it is also difficult or even impossible to negotiate with track chain vehicles. It has also been found that none of the known vehicles takes into account, as far as the power drive means are concerned for the movement on land and the movement on water, the particularly difficult conditions encountered in landing or launching the vehicle. However, in the construction of a vehicle which is really unlimited as to its deployment as an amphibious vehicle, that is one of the most important problems.

The problem is solved in accordance with the invention by providing an amphibious vehicle having preferably an armored body with a wheel drive for land travel and a propeller drive for water travel, where the running wheels are equipped with oversized, shot-proof low pressure air tires, and where furthermore the driving of the wheels for land travel and/or of the propeller for travel on water is effected optionally by a drive assembly.

In order to attain a land velocity which is less than that of the water travel velocity with simultaneous wheel and propeller drive, a suitable land drive transmission is provided.

The propeller means for driving the vehicle on water can be moved about the vertical as well as the horizontal axis of its connection point with the vehicle body.

The rear axle of the wheel drive for land travel is in the form of a jointed cross shaft or knee axle.

The fresh air supply and waste gas outlet for the drive motor of the vehicle are arranged centrally of the vehicle body on the deck and are preferably provided with shaft members that can be laid over onto the deck of the vehicle.

The vehicle body proper is preferably streamlined at least around the region of the bow.

The tires of the front wheels project beyond the bow of the vehicle. The front axle of the vehicle is designed as the steering axle. In order to execute turns of very small radius, the vehicle is preferably provided with an additional steering brake which acts on the front wheels or front and rear wheels or rear wheels of one side at a time.

If desired, the vehicle may be equipped with a single axle trailer or may also be coupled to a similar vehicle, which further improves and enhances the possibilities of utilization. For this purpose a connecting link may be provided at the stern of the vehicle and the level of the deck while a hydraulic cylinder is interconnected to obtain optionally a movable or rigid connection of the vehicle with the trailer or with a similar second vehicle. In order to support the pulling or pushing forces of a land and/or water drive, the vehicle may be provided with a winch. Such a winch can be driven simultaneously by the land and/or water propulsion means.

Finally the vehicle is equipped in a known manner with a differential pawl.

Further features of the invention and details of the advantages provided thereby will become apparent from the following specification describing an embodiment of the vehicle which is illustrated in the accompanying drawings, and in which.

Figure 6:
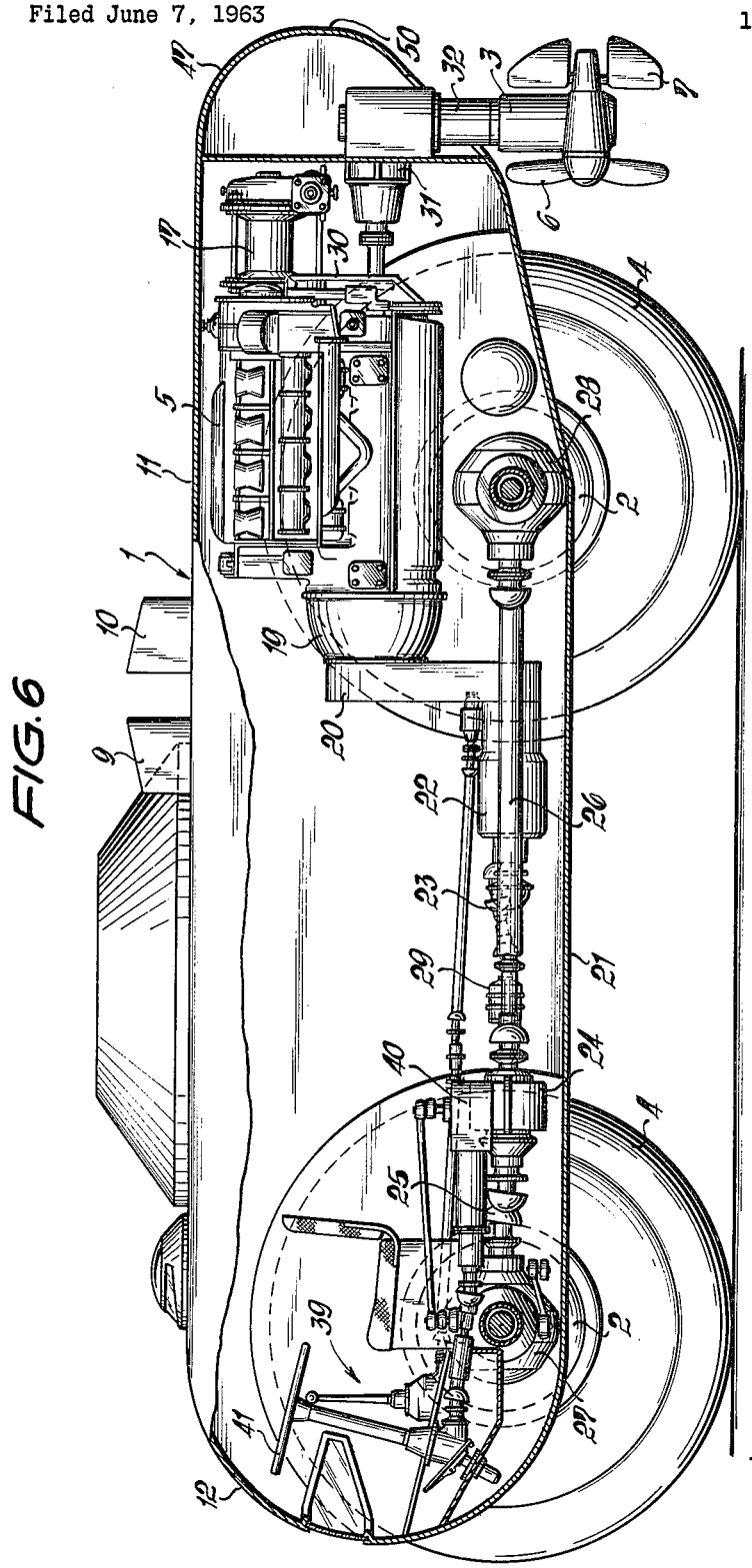
Figure 7:
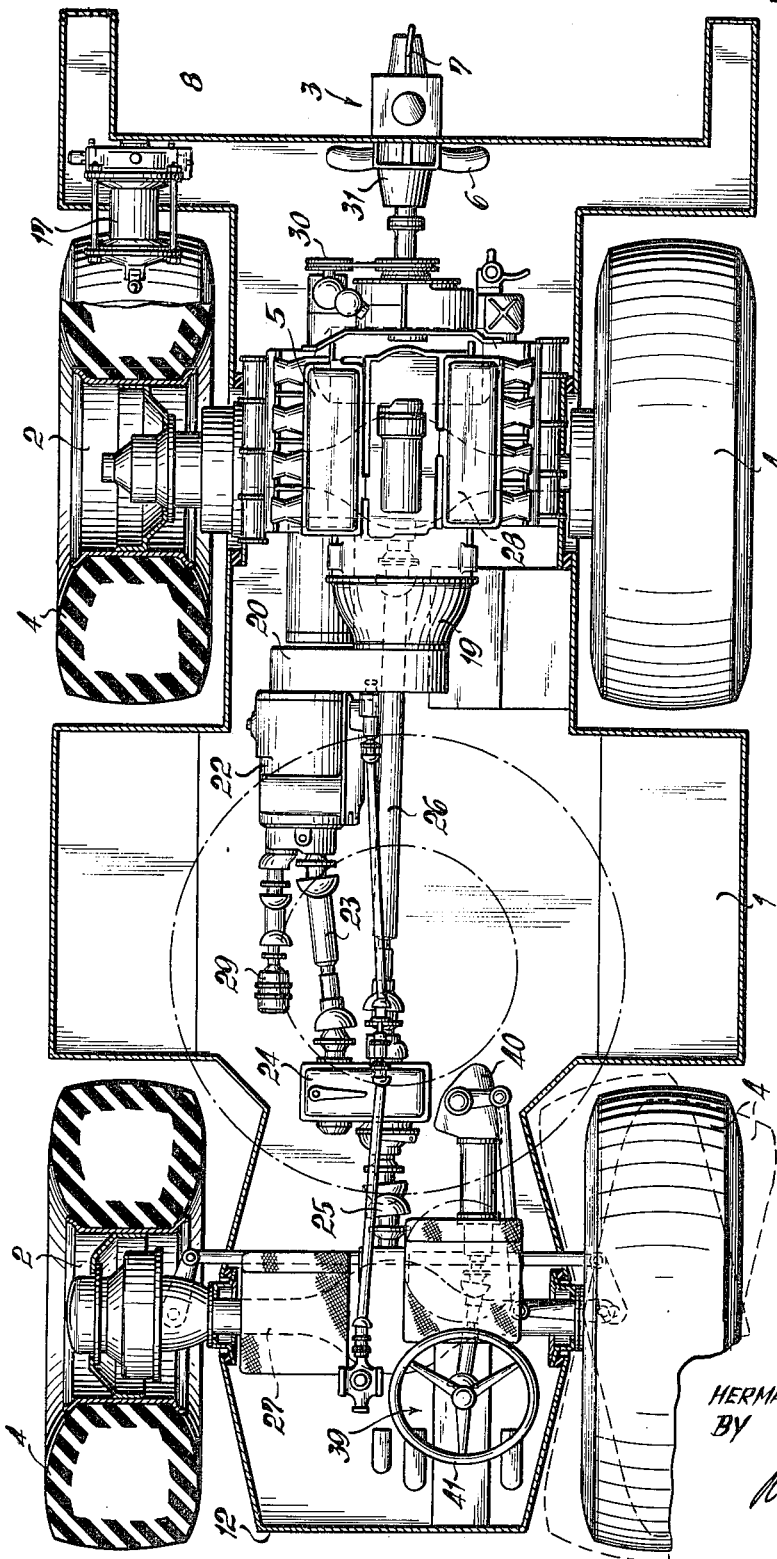
Figure 10:
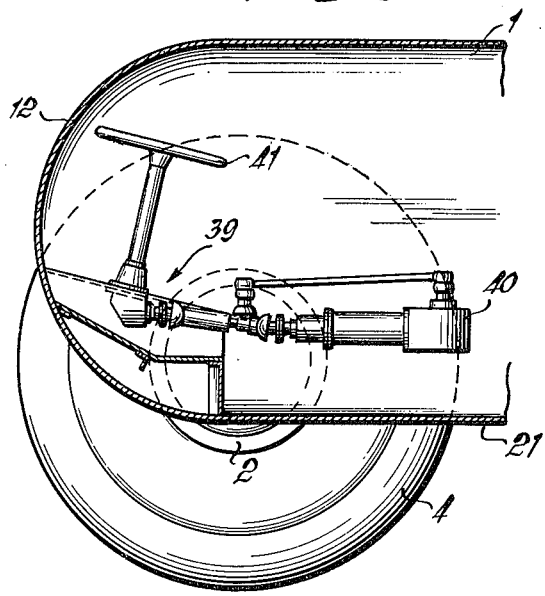
Figure 10A:
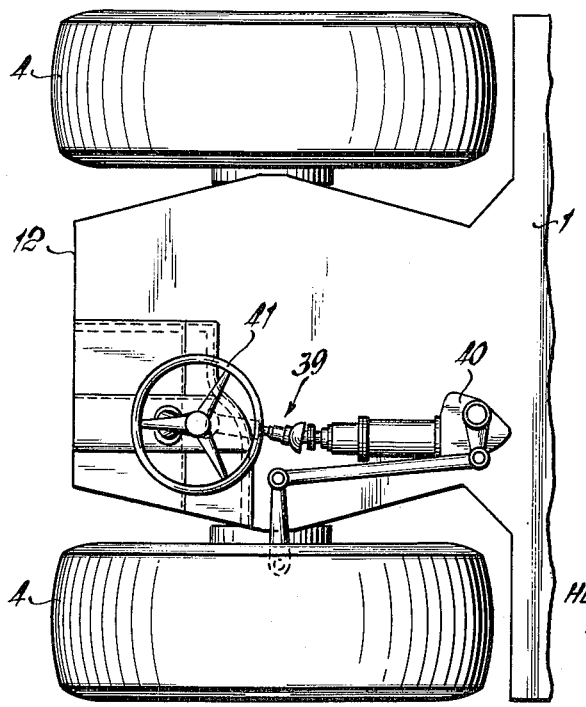
Figure 13:
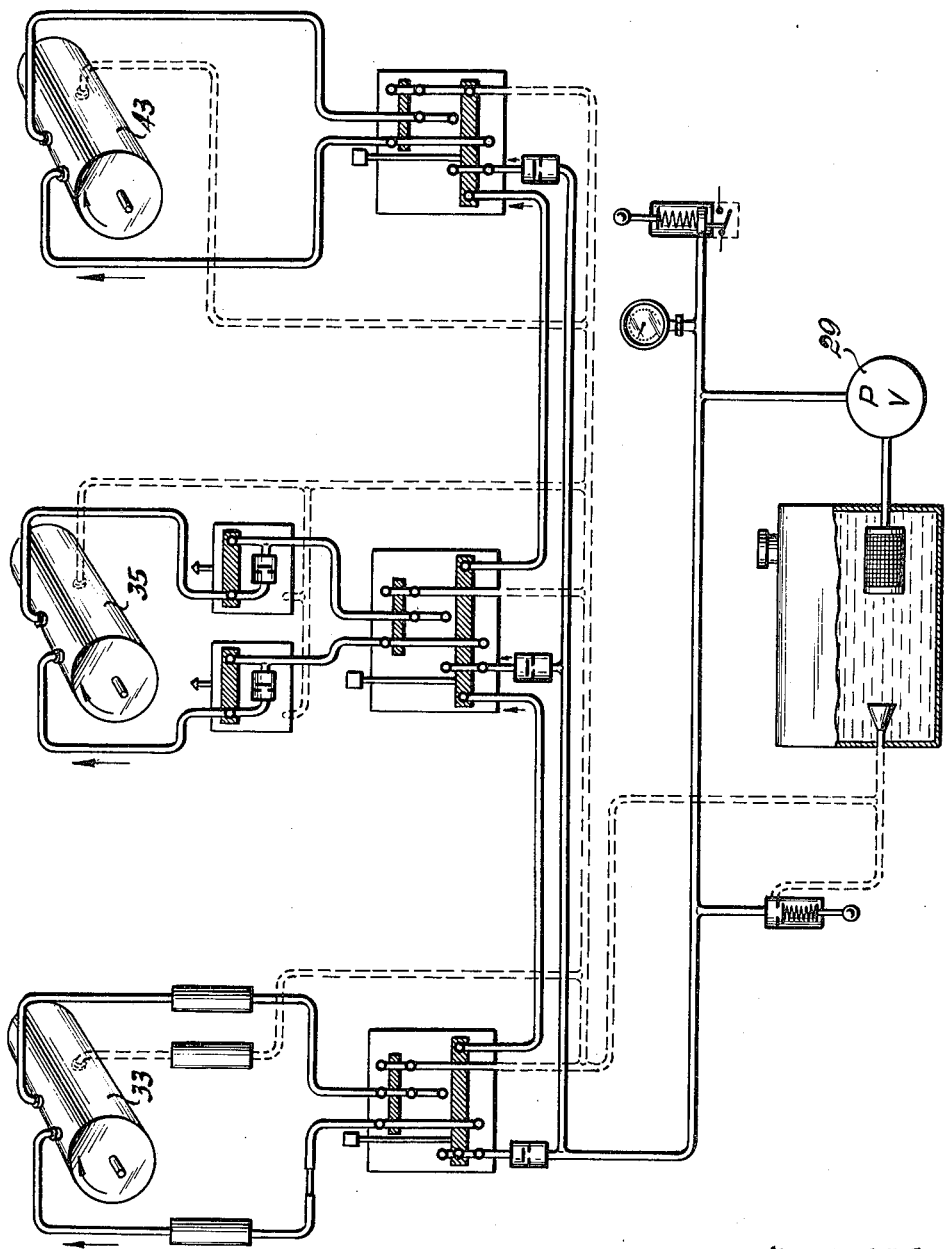

FIG. 6 is a side view of the vehicle, partly in section, showing the engine and transmission means, FIG. 7 is a top view of the vehicle corresponding to FIG. 6, FIGS. 8 and 8a illustrate the mounting of the rudder propeller in side and top view, FIGS. 9 and 9a show details of the air circulating system in a side view and a top view, FIGS. 10, 10a and 11 illustrate the arrangement of the steering and braking means in the vehicle, FIGS. 12 and 12a are sectional side and top views of the cable winch in the stern of the vehicle, and FIG. 13 is a schematic diagram of the hydraulic system.

The vehicle body 1 of the amphibious vehicle in accordance with the invention which is preferably anchored is equipped with four wheels for land travel and a propeller drive for travel on water.

The wheels are equipped with oversize shot-proof low pressure air tires. The drive of the wheels 2 and/or of the propeller means 3 is effected optionally by means of a drive assembly 5.

The selection of a wheel drive for land travel for the vehicle in accordance with the invention results from the fact that the air pressure of the tires must be substantially equal to the ground pressure. The state of the tire art at the present time makes it possible to provide oversized air tires which can be driven with very small air pressure, i.e., so-called low pressure air tires.

Furthermore, such tires can also be constructed in a manner that they are not affected by penetrating shots. It is readily possible to make the tires so large that the contact plane thereof with the ground becomes greater that with a comparable chain track vehicle. Tests which have been carried on have shown that tires of a size 18 x 25 cm. require only an atmosphere pressure of 0.3 for a load of 2.5 tons.

The use of such oversized tires proposed in accordance with the invention provides right from the start for substantially less weight of the driving mechanism for land travel than what is necessary with chain track vehicles. Besides they have a considerable buoyancy, which is of importance for the amphibious vehicle for which they are intended. Furthermore they increase considerably the floating stability of the vehicle. Finally, air tires of such dimensions eliminate any spring means, which are indispensable with chain track vehicles. This means that either the weight of the vehicle which can be reduced considerably while gaining additional buoyancy or the saving in weight thus obtained can be utilized for special equipment in the vehicle, depending on the task to be performed, for example, improvement of armor that might be required. Added to this is the fact that the contact surface is correspondingly increased as the vehicle moves on swampy ground when the tires sink into the ground, and thus the land maneuverability is improved as compared to equivalent chain track vehicles which, as shown by experience, cannot be deployed in swampy ground.

As mentioned above, the vehicle is provided with a propeller drive for water travel in addition to its wheel drive for land travel. A so-called rudder propeller can be used as the propulsion means, that is a driving assembly which is pivotally movable about its vertical axis, so that the propeller 6 and the steering rudder surfaces 7 provide together for a change in the direction of travel of the vehicle during travel on water as the drive assembly is turned about the vertical axis. The drive of the propeller 6 in this connection is provided by the same drive engine as the drive for the wheels 2 for travel on land. At the same time a suitable transmission makes it possible that the drive engine can optionally be utilized for driving the wheels 2 for travel on land or for driving the propeller means 3 for travel on water. Furthermore in accordance with the invention both driving means can be used simultaneously. This is necessary for negotiating the bank regions so that, for example, in climbing the incline of a bank the water drive means at the stern of the vehicle can still support the wheel drive as long as the propeller means 3 is in the water. In this connection it must be noted that means are provided which make it possible to hold down the land travel speed for this condition of operation of the vehicle in such a manner that the land velocity is less than the water velocity, or at best reaches that velocity. For this purpose a suitable land traveling transmission is provided.

This is important for the reason that the thrust of the propeller 6 increases as the square of the number of revolutions. A minor decrease of the number of revolutions of the propeller therefore causes a substantial decrease of the thrust of the propeller. If the wheel and propeller drive are cut in simultaneously, the circumferential velocity of the tires, i.e., the land travel velocity, becomes greater than the water travel velocity, then when driving out of the water as the tires first touch the ground, the number of revolutions of the motor and therefore the revolutions of the propeller are decreased. Thus the propeller would be eliminated as an aid to the thrust during the landing operation. In this condition the wheels usually exert no essential pressure against the ground. With steep embankments driving out of the water under one's own power would therefore no longer be possible. However, if provisions are made for the land travel drive means that the land travel velocity is less than or at the most equal to the water travel velocity, then the propeller 6 can actually provide substantial support for the drive power of the wheels. In this manner smooth driving out of the water and climbing of the embankment incline is insured. The entire driving force is thus divided depending on the gripping of the ground by the wheels in proportionate parts between the wheels and the propeller.

It is, of course, necessary that in order for vehicles of this type to be truly unobjectionably deployable, all terrain obstacles that occur must be overcome alone and without drawing on auxiliary help. As already mentioned, the greatest difficulties usually occur at the bank regions between water and land. Accordingly the construction of the vehicle is particularly aimed at smoothly negotiating these bank regions, besides providing complete and satisfactory deployment on land as well as in water. Accordingly it is furthermore provided that the water drive 3 cannot only be moved about its vertical axis but also about a horizontal axis at its connection point with the body of the vehicle 1 and particularly about the horizontal axis which extends longitudinally of the body of the vehicle 1.

The movability about the longitudinal axis is preferably effected by a hydraulic cylinder so that the level of the propeller can be adjusted by means of the aforementioned measure in order to avoid that while the vehicle leaves the water, contact is established with the ground. Inasmuch as the propeller 6 moves out of the center of the vehicle during lateral swinging about the longitudinal axis of the vehicle, a counter force is established simultaneously during landing with the vehicle that is disposed obliquely with respect to the current which counteracts any drifting of the vehicle away from the bank. Since the propeller shaft is swung about the drive shaft, there exists a permanent force transmitting connection with the drive motor also during the lateral swinging movement of the propeller unit.

Figure 2:
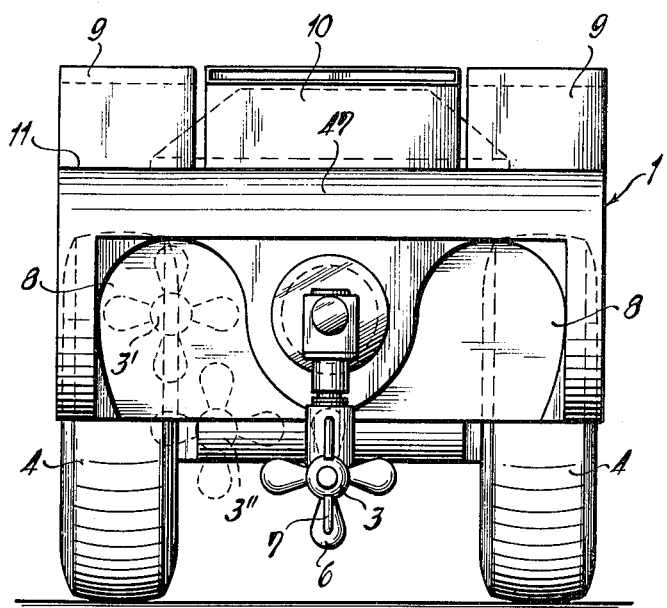
FIG. 2 is an end view thereof.
Figure 3:
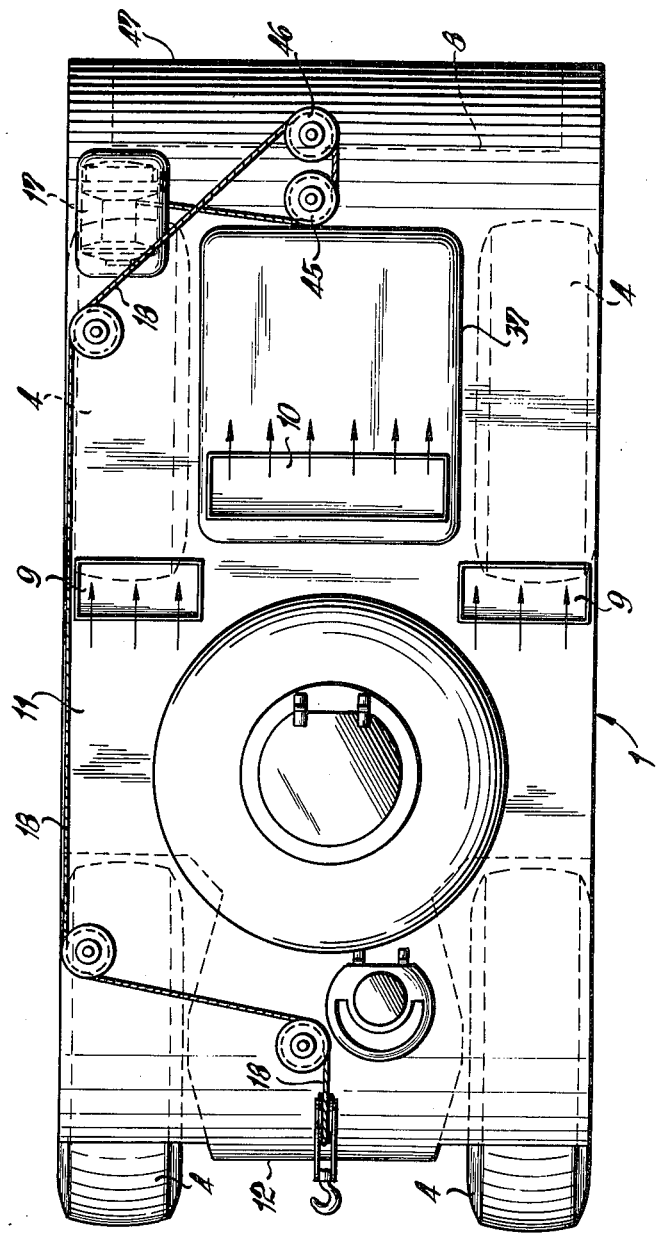
FIG. 3 is a top plan view of the vehicle.
Figure 4:
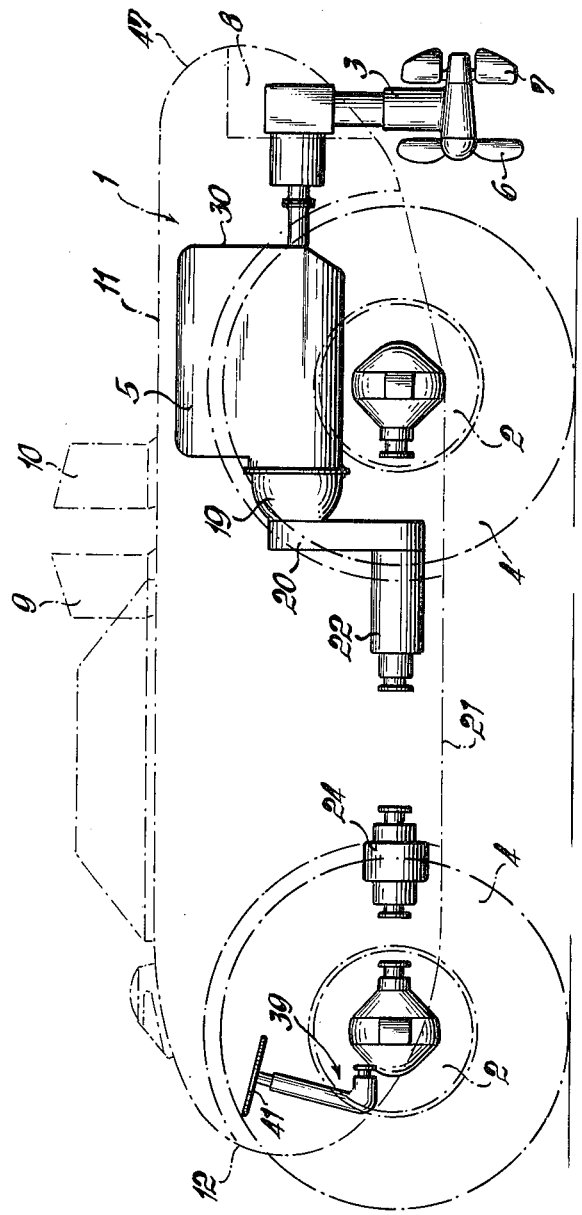
FIG. 4 illustrates particularly the arrangement of the drive means.
Figure 5:
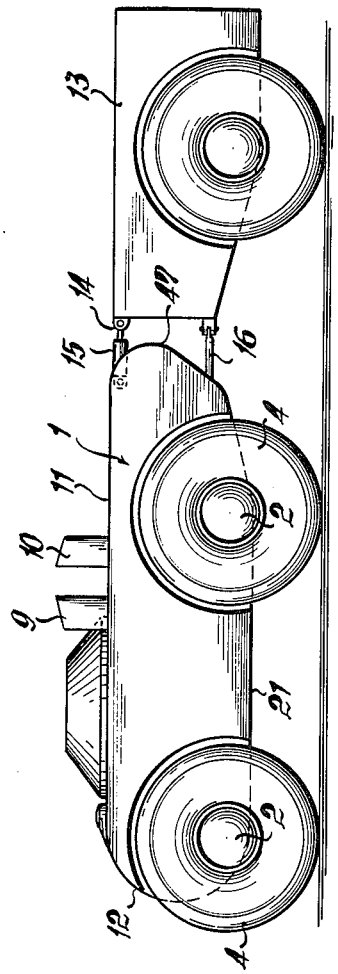
FIG. 5 shows the vehicle equipped with a trailer.

FIG. 2 shows in dot and dash lines the propeller assembly 3 in two positions 3' and 3" displaced from the center. Depending on the construction of the vehicle body, the body may be provided with a suitable recess 8 which permits the shifting or displacement movements of the propeller assembly 3, if desired, to both sides, i.e., towards the left as in FIG. 2 and also toward the right.

In order to insure of balanced loading of all four tires 4 on the ground also under difficult terrain conditions, the rear axle is constructed as a jointed or knee axle.

Figure 1:
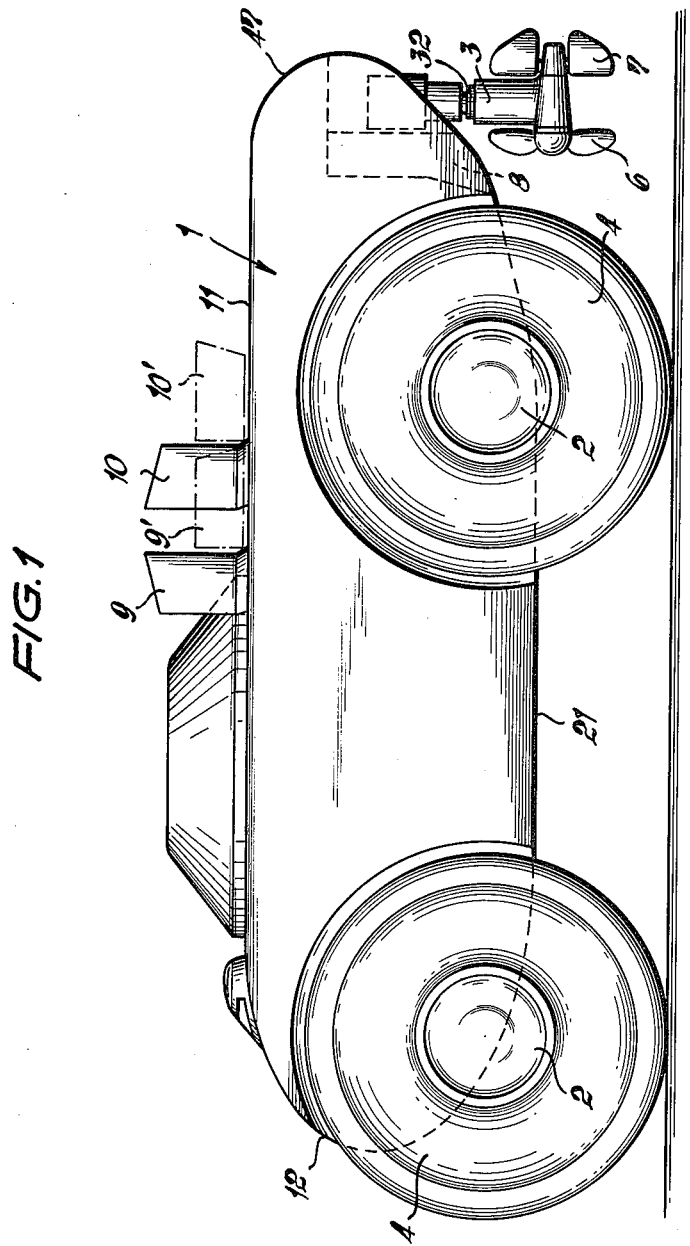
FIG. 1 is a side view of the amphibious vehicle.

As repeatedly mentioned, the most difficult operating conditions for amphibious vehicles arise during landing or launching. With steep bank slopes it can happen that also the deck of the vehicle is partly flooded. Accordingly the air supply or intake means 9 and the outlet 10 for the gases of combustion of the vehicle motor are in the center or at least approximately in the center of the vehicle body 1 on the deck 11 and are preferably in the form of shafts which can be laid over on the deck. The position of the shafts is indicated in FIG. 1 in dot and dash lines at 9' and 10'.

By virtue of this arrangement of the air intake and gas outlet it is made possible also under the most extreme conditions to prevent water from entering the interior of the vehicle and above all from reaching the motor. It should be noted that in any case the center of the deck of the vehicle is always flooded last. If also there flooding should be expected, then the inlet and outlet shafts 9 and 10 can be erected.

Heretofore amphibious vehicles were conventionally constructed in a manner that the body of the vehicle was in the form of a pontoon in order to direct the wave at the bow downwardly. Furthermore amphibious vehicles have already been constructed with bodies similiar to the bodies of actual water vehicles, i.e., with a pointed bow. In any case the bow wave contributes substantially to the increase of the drive resistance in the water and affects to a great extent the trimming. Accordingly the body of the vehicle in accordance with the invention is of true streamlined construction, at least in the area of the bow, which results in the lowest possible driving resistance. This is possible because the deck of the vehicle can, if necessary, be completely flooded because it is of water-tight construction. The fresh air inlets and the waste gas outlets even then extend sufficiently far out of the water.

By virtue of the streamlined bow form it is also achieved that the vehicle body is shot-proof to an increased extent in the event that the vehicle is to be deployed as a combat vehicle.

Finally the streamlined construction of at least the bow of the vehicle body results in attaining a substantial saving in power consumption and accordingly also in the size and weight of the power plant, because as learned from experience and as is well known, the motor output of amphibious vehicles must be determined in accordance with the power requirement for water travel.

Also the arrangement of the front wheels contributes to the especially satisfactory negotiating of the difficult region between water and land in a manner that the tires project forwardly of the bow 12. In this manner it is accomplished that even vertical obstacles up to a certain height can be driven over. In particular, however, this arrangement of the wheels is especially advantageous for negotiating steep bank inclines.

The steering of the vehicle is effected by means of a front axle which is constructed as a conventional steering axle, while the turning angle of this front steering axle is limited to that necessary for conventional street travel in order to avoid too great a loss in buoyancy of the vehicle body 1 such as would result from large wheel housings. In order to execute very small turns as may, for example, be imposed by the conditions of the terrain, a steering brake can be provided which in addition acts on one wheel or both wheels on one side of the vehicle at a time.

As heretofore described the vehicle is thus completely self-sufficient, and it is deployable as an amphibious vehicle under the most severe terrain conditions. A further improvement of the deployability can, if desired, be achieved by the arrangement of a single axle trailer 13 on the vehicle which can be connected with the body to be optionallly movable or inflexible. For this purpose a connection 14 is provided between the vehicle body 1 and the trailer 13 at the level of the deck 11 of the vehicle body 1 with a hydraulic cylinder 15 interconnected. For land travel this connection will normally be movable, so that in practice only a pulling connection 16 is utilized. For travel on water the connection 14 can be locked in any desired position, so that together with the connection 16 an inflexible connection is established between vehicle and trailer. As a result the decks of the vehicle and of the trailer will for normal water travel be in the same plane. While negotiating steep bank inclines, the two decks may define an angle which is open at the top so that in this manner the driving means of the trailer facilitate the landing maneuvers of the vehicle.

The connection which is provided may also serve for connecting two vehicles of the type which are the object of the invention.

In order that the vehicle can also cope with all of the most difficult terrain conditions, a winch 17 is also provided which is equipped with a cable and tackle, whereby the pulling or pushing forces of the wheel or of the propeller drive of the vehicle can be supported, provided a suitable fixed anchoring point is present in the terrain.

For coordination with the drive means of the vehicle the cable winch 17 can optionally be driven with the same drive motor 5 together with the wheels 2 and the propeller 6.

Finally the vehicle such as is known and conventional in connection with land driven vehicles can be provided with a differential pawl.

The vehicle in accordance with the invention can, of course, also be of different design and fitting than what is necessary for its use as an amphibious vehicle, depending on the purpose for which it is employed. Thus the vehicle body 1 can be provided with a hatch on top for use as a transport vehicle and with a lateral hatch as armoring. It can also be equipped with suitable appointments as a crane vehicle, as a dredge, a scoop loader, a fork stacker or as a ditch digging machine.

Besides the numerous advantages already mentioned, particularly in connection with overcoming steep bank inclines or the like it should also be mentioned that there wheel vehicles afford additional advantages as compared to the track chain vehicles which were used before to solve the aforementioned problems.

In driving onto steep bank inclines track chain vehicles on which the upper edge is not extensively rounded will maintain their inclined position until the center of gravity of the vehicle is disposed vertically above the upper edge of the inclined plane. In the next moment the entire vehicle will suddenly assume a horizontal position with the sudden change in inclination taking place even faster depending on the resiliency of the individual rollers on which the track chains are guided. This leads to very heavy shocks and this cannot be avoided even at the slowest velocity of travel. With wheel vehicles this change in direction takes place always gradually, even then when very steep embankments change suddenly over to a horizontal embankment top, and even when vertical slopes are negotiated and that by virtue of the fact that the body of wheel drive vehicles provides considerable clearance between the front and rear wheels.

Finally it is again stated that only the construction of an amphibious vehicle in accordance with the invention permits deployment thereof in any conceivable and even the most difficult terrain, that the vehicle is particularly capable of negotiating the transition from water to land and vice versa without outside help and without any essential delays and that this vehicle by virtue of its construction is also suitable when amphibiously deployed to serve different purposes, such as, for example, as an armored combat vehicle.

As illustrated more clearly in FIGS. 6 and 7, the motor 5 is connected by way of a main coupling, and an intermediate transmission with the six gear transmission which includes a reverse gear for street travel and is disposed over the floor of the vehicle. This six gear transmission has a driving connection by means of an articulated shaft with a two speed distributor transmission. One each articulated shaft leads from this distributor transmission to each the front and the rear axle. Independently of the gear to which the six gear transmission has been shifted a hydraulic pump is driven at the speed of the motor.

At the rear end of the motor the crank shaft is connected to the rudder propeller 6 by way of an electromagnetic coupling. This coupling renders the rudder propeller inoperative during street travel. During travel on water the six gear transmission is shifted to neutral, thus rendering the entire street travel mechanism inoperative. For landing operations of the vehicle the six gear transmission is shifted to first or low speed while in the distributor transmission the land travel gear is activated and in addition the rudder propeller is rendered operative by means of the electromagnetic coupling. In this manner it becomes possible to distribute the driving power of the wheels and of the propeller to meet the instant requirements.

FIGS. 8 and 8a illustrate the mounting of the rudder propeller which is pivotally movable about its vertical axis to enable the vehicle to be moved efficiently on the water. The drive of the steering movement is derived from the oil motor 34 by way of a chain drive. For street travel the rudder propeller is swung in through an angle of 90° in order to have a sufficient free space at the over-lapping stern of the vehicle. The pivotal movement of the propeller assembly is effected by means of the oil motor 10 which performs the pivotal movement by way of a pinion and tooth segment. The steering drive means is fastened to the rudder propeller and therefore follows this pivotal movement.

FIGS. 9 and 9a illustrate in greater detail the manner in which the cooling air and the combustion gases are conducted through the vehicle. The motor is encased in the center part of the vehicle by menas of lining plates forming a casing. The fresh air is introduced at the front end of the motor through the two shafts 9 provided on both sides of the vehicle. The outgoing air of the cooling system passes through a shaft 10 in the center of the vehicle. The exhaust pipes 30, 31 discharge directly into the air outlet shaft 10. Fresh air for the combustion is drawn in through lateral intake pipes (not shown).

FIGS. 10, 10a and 11 show the details of the manner in which the steering and braking means are mounted in the vehicle. The normal steering means which include a spindle gearing are indicated in FIG. 10. This spindle gearing aids the steering forces imparted by the steering wheel and thus provides for easy steering in spite of the higher weight of the vehicle which results from the armoring. When the steering wheel is moved almost to the greatest turning angle, a valve is actuated which controls the braking air for the wheel brakes on one side of the vehicle. In this manner one wheel side is blocked and the turning angle is considerably decreased. The control lever, fastened to the steering lever of the steering gear, actuates either the left or the right control valve 01 by way of the two cables 02 when the wheel is turned approximately to the maximum turning angle. The mounting of these two braking valves is indicated in the schematic diagram of the overall braking system in FIG. 11 where the two valves are shown at 07.

The arrangement of the cable winch in the stern of the vehicle is illustrated more clearly in FIGS. 12 and 12a. The drive of the cable winch is effected by the hydraulic motor 23 and the chain drive illustrated in the drawing. Suitable cable pulleys 06 and 07 provide that the cable can be fed in the direction of the bow of the vehicle as well as in the direction of the stern. The oil motor for the anchor winch as well as also the oil motors for steering and swinging of the rudder propeller are fed by the same hydraulic pump.

The hydraulic system is illustrated in FIG. 13. Inasmuch as the hydraulic pump is driven at motor speed independently of the gearing position to which the transmission gear has been shifted, the cable winch can be used either with the transmission means being set for land travel as well as when the rudder propeller is connected for travel on water.

Having now described our invention with reference to the embodiment illustrated in the drawings, we do not wish to be limited thereto, but what we wish to protect by Letters Patent of the United States of America is set forth in the appended claims.

We claim:
1. Amphibious vehicle having a body adapted to be armored and having power driven front and rear axles connected with front and rear wheels for travel on land, propeller means for travel on water, and drive means for said front and rear wheels and for said propeller means, said wheels being equipped with oversized, shot-proof low pressure tires, the tires for said power driven front wheels projecting ahead of said body, and said drive means including transmission means selectively operative to drive said front and said rear wheels together, said wheels and said propeller means simultaneously, and said propeller means separately, and said transmission mean including a propeller driving transmission portion and a land driving transmission portion operative at a land travelling speed not exceeding the speed of water travel, said propeller driving transmission portion including a horizontal drive shaft and said propeller means including a propeller drive shaft extending perpendicularly to said horizontal drive shaft and being connected thereto and pivotally movable about its own axis and about the axis of said horizontal drive shaft.

2. Amphibious vehicle having a body adapted to be armored and having power driven front and rear axles connected with front and rear wheels for travel on land, propeller means for travel on water, and drive means for said front and rear wheels and for said propeller means, said wheels being equipped with oversized, shot-proof low pressure tires, the tires for said power driven front wheels projecting ahead of said body, and said drive means including transmission means selectively operative to drive said front and said rear wheels together, said wheels and said propeller means simultaneously, and said propeller means separately, and said transmission means including a propeller driving transmission portion and a land driving transmission portion operative at a land travelling speed not exceeding the speed of water travel, said propeller driving transmission portion including a horizontal drive shaft, said propeller means including a propeller drive shaft extending perpendicularly to said horizontal drive shaft and being connected thereto and pivotally movable about its own axis and about the axis of said horizontal drive shaft, and a cable winch including a cable and blocks being mounted on the deck of said vehicle for selectively supporting the pulling and thrust forces of the said land driving transmission portion, of said propeller driving transmission portion, and of both said land driving transmission portion and said propeller driving transmission portion together, said cable winch being arranged to be driven simultaneously by said land driving transmission portion and by said propeller driving transmission portion.

References Cited by the Examiner

UNITED STATES PATENTS

| | | | |
|---|---|---|---|
| 1,537,319 | 5/25 | Luge | 115—1 |
| 2,339,542 | 1/44 | Hale | 152—347 X |
| 2,432,107 | 12/47 | Williams | 115—1 |
| 2,908,241 | 10/59 | Todd | 115—1 |
| 2,908,243 | 10/59 | Erickson | 115—41 |
| 2,981,221 | 4/61 | Gillois et al. | 115—1 |
| 3,027,862 | 4/62 | Votre | 115—1 |
| 3,057,319 | 10/62 | Wagner | 115—1 |

FOREIGN PATENTS 454,634   2/49   Canada.

MILTON BUCHLER, *Primary Examiner.*

ANDREW H. FARRELL, *Examiner.*